(12) United States Patent
Ostebee et al.

(10) Patent No.: US 9,587,562 B2
(45) Date of Patent: Mar. 7, 2017

(54) VARIABLE VOLUME COMBUSTOR WITH AERODYNAMIC SUPPORT STRUTS

(71) Applicant: General Electric Company, Schenectady, NY (US)

(72) Inventors: Heath Michael Ostebee, Piedmont, SC (US); Thomas Edward Johnson, Greer, SC (US); Jason Thurman Stewart, Greer, SC (US); Christopher Paul Keener, Woodruff, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1008 days.

(21) Appl. No.: 13/760,097

(22) Filed: Feb. 6, 2013

(65) Prior Publication Data
US 2014/0216054 A1    Aug. 7, 2014

(51) Int. Cl.
  *F23R 3/28*     (2006.01)
  *F02C 7/20*     (2006.01)
  *F02C 3/14*     (2006.01)
  *F23R 3/46*     (2006.01)

(52) U.S. Cl.
  CPC .................. *F02C 7/20* (2013.01); *F02C 3/14* (2013.01); *F23R 3/283* (2013.01); *F23R 3/286* (2013.01); *F23R 3/46* (2013.01); *F23D 2900/14004* (2013.01)

(58) Field of Classification Search
  CPC ............. F23R 3/28; F23R 3/283; F23R 2/286
  See application file for complete search history.

(56) References Cited

U.S. PATENT DOCUMENTS

| | | |
|---|---|---|
| 3,738,106 A | 6/1973 | Stein et al. |
| 3,742,703 A | 7/1973 | Melconian |
| 3,745,766 A | 7/1973 | Melconian |
| 4,044,553 A | 8/1977 | Vaught |
| 4,365,910 A | 12/1982 | Ford |
| 4,417,846 A | 11/1983 | Elliston |
| 4,497,170 A | 2/1985 | Elliott et al. |
| 4,532,762 A | 8/1985 | Mongia et al. |
| 4,545,196 A | 10/1985 | Mongia et al. |
| 4,567,724 A | 2/1986 | Mongia et al. |
| 4,844,649 A | 7/1989 | Vandenboom |
| 5,195,853 A | 3/1993 | Dooley |
| 5,319,923 A | 6/1994 | Leonard et al. |
| 5,343,697 A | 9/1994 | Johnson et al. |
| 5,404,633 A | 4/1995 | Givler |
| 5,540,056 A | 7/1996 | Heberling et al. |

(Continued)

OTHER PUBLICATIONS

U.S. Appl. No. 13/471,488, filed May 15, 2012, Keener, et al.
U.S. Appl. No. 13/669,479, filed Nov. 6, 2012, Chen, et al.

*Primary Examiner* — Patrick Hamo
(74) *Attorney, Agent, or Firm* — Sutherland Asbill & Brennan, LLP (57) ABSTRACT

The present application provides a combustor for use with a gas turbine engine. The combustor may include a number of micro-mixer fuel nozzles and a fuel injection system for providing a flow of fuel to the micro-mixer fuel nozzles. The fuel injection system may include a number of support struts supporting the fuel nozzles and providing the flow of fuel therethrough. The support struts may include an aerodynamic contoured shape so as to distribute evenly a flow of air to the micro-mixer fuel nozzles.

19 Claims, 9 Drawing Sheets

(56) References Cited

U.S. PATENT DOCUMENTS

| | | |
|---|---|---|
| 5,551,228 A | 9/1996 | Mick et al. |
| 5,664,412 A | 9/1997 | Overton |
| 5,895,211 A | 4/1999 | McMillan |
| 6,425,240 B1 | 7/2002 | Park |
| 6,438,959 B1 | 8/2002 | Dean et al. |
| 7,093,445 B2 | 8/2006 | Corr, II et al. |
| 7,500,347 B2 | 3/2009 | Sanders et al. |
| 7,661,267 B2 | 2/2010 | Pollarolo |
| 2009/0016810 A1 | 1/2009 | Geiger et al. |
| 2010/0175380 A1* | 7/2010 | Davis, Jr. ............... F23R 3/286 60/734 |
| 2011/0252805 A1 | 10/2011 | Berry et al. |
| 2012/0085100 A1 | 4/2012 | Hughes et al. |
| 2012/0198851 A1 | 8/2012 | Davis, Jr. et al. |
| 2012/0198856 A1 | 8/2012 | Uhm et al. |
| 2013/0025283 A1* | 1/2013 | Berry ..................... F23R 3/283 60/737 |

* cited by examiner

VARIABLE VOLUME COMBUSTOR WITH AERODYNAMIC SUPPORT STRUTS

STATEMENT REGARDING FEDERALLY SPONSORED RESEARCH OR DEVELOPMENT

This invention was made with government support under Contract No. DE-FC26-05NT42643 awarded by the U.S. Department of Energy. The Government has certain rights in this invention.

TECHNICAL FIELD

The present application and the resultant patent relate generally to gas turbine engines and more particularly relate to a variable volume combustor with a fuel injection system using a number of aerodynamically shaped support struts to limit airflow disruptions.

BACKGROUND OF THE INVENTION

Operational efficiency and the overall output of a gas turbine engine generally increases as the temperature of the hot combustion gas stream increases. High combustion gas stream temperatures, however, may produce higher levels of nitrogen oxides and other types of regulated emissions. A balancing act thus exists between the benefits of operating the gas turbine engine in an efficient high temperature range while also ensuring that the output of nitrogen oxides and other types of regulated emissions remain below mandated levels. Moreover, varying load levels, varying ambient conditions, and many other types of operational parameters also may have a significant impact on overall gas turbine efficiency and emissions.

Lower emission levels of nitrogen oxides and the like may be promoted by providing for good mixing of the fuel stream and the air stream prior to combustion. Such premixing tends to reduce combustion temperature gradients and the output of nitrogen oxides. One method of providing such good mixing is through the use of a combustor with a number of micro-mixer fuel nozzles. Generally described, a micro-mixer fuel nozzle mixes small volumes of the fuel and the air in a number of micro-mixer tubes within a plenum before combustion.

Although current micro-mixer combustors and micro-mixer fuel nozzle designs provide improved combustion performance, the operability window for a micro-mixer fuel nozzle in certain types of operating conditions may be defined at least partially by concerns with dynamics and emissions. Specifically, the operating frequencies of certain internal components may couple so as to create a high or a low frequency dynamics field. Such a dynamics field may have a negative impact on the physical properties of the combustor components as well as the downstream turbine components. Given such, current combustor designs may attempt to avoid such operating conditions by staging the flows of fuel or air to prevent the formation of a dynamics field. Staging seeks to create local zones of stable combustion even if the bulk conditions may place the design outside of typical operating limits in terms of emissions, flammability, and the like. Such staging, however, may require time intensive calibration and also may require operation at less than optimum levels.

There is thus a desire for improved micro-mixer combustor designs. Such improved micro-mixer combustor designs may promote good mixing of the flows of fuel and air therein so as to operate at higher temperatures and efficiency but with lower overall emissions and lower dynamics. Moreover, such improved micro-mixer combustor designs may accomplish these goals without greatly increasing overall system complexity and costs.

SUMMARY OF THE INVENTION

The present application and the resultant patent provide a combustor for use with a gas turbine engine. The combustor may include a number of micro-mixer fuel nozzles and a fuel injection system for providing a flow of fuel to the micro-mixer fuel nozzles. The fuel injection system may include a number of support struts supporting the fuel nozzles and providing the flow of fuel therethrough. The support struts may include an aerodynamic contoured shape so as to distribute evenly a flow of air to the micro-mixer fuel nozzles.

The present application and the resultant patent further provide a support strut for use with a micro-mixer fuel nozzle. The support strut may include an airfoil body and an aerodynamic mounting section positioned on the airfoil body. The aerodynamic mounting section may include a first built up area on a first sidewall and a second built up area on a second sidewall and with one or more fuel ports extending therein.

The present application and the resultant patent further provide a fuel manifold for providing a flow of fuel in a gas turbine engine. The fuel manifold may include a number of micro-mixer fuel nozzles and a number of support struts supporting the fuel nozzles and providing the flow of fuel therethrough. The support struts may include an aerodynamic contoured shape with an aerodynamic mounting section positioned thereon.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
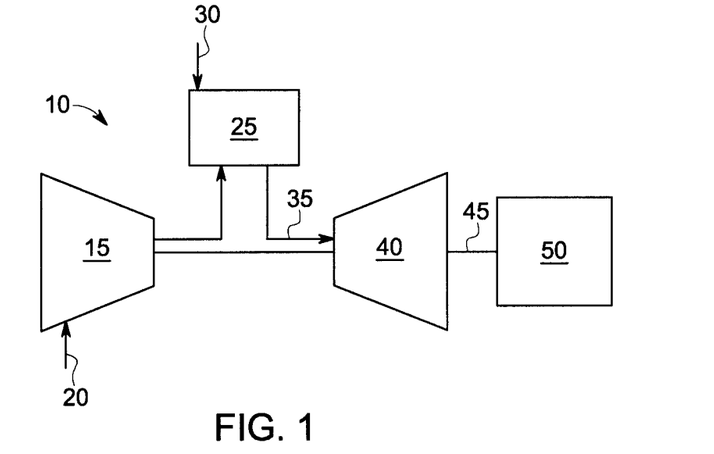
FIG. 1 a schematic diagram of a gas turbine engine showing a compressor, a combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and combinations thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
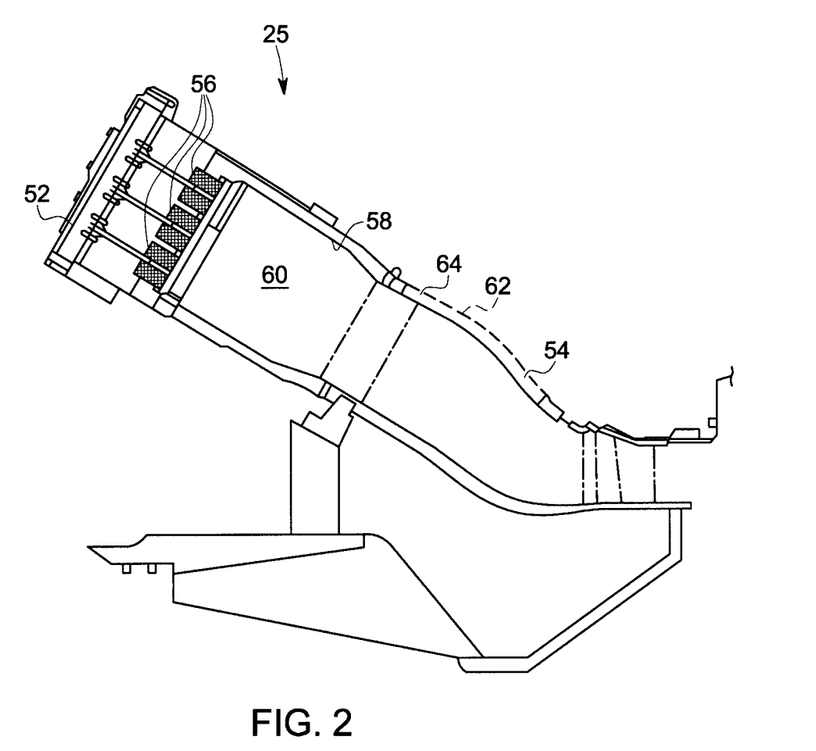
FIG. 2 is a schematic diagram of a combustor that may be used with the gas turbine engine of FIG. 1.

FIG. 2 shows a schematic diagram of an example of the combustor 25 as may be used with the gas turbine engine 10 described above and the like. The combustor 25 may extend from an end cover 52 at a head end to a transition piece 54 at an aft end about the turbine 40. A number of fuel nozzles 56 may be positioned about the end cover 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. Any number of the combustors 25 may be used herein in a can-annular array and the like. The combustor 25 described herein is for the purpose of example only. Combustors with other components and other configurations may be used herein.

Figure 3:
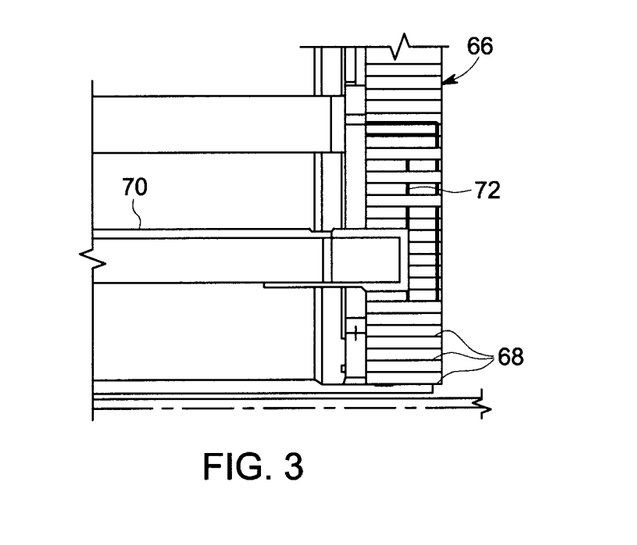
FIG. 3 is a schematic diagram of a portion of a micro-mixer fuel nozzle that may be used with the combustor of FIG. 2.

FIG. 3 shows a portion of a micro-mixer fuel nozzle 66 that may be used with the combustor 25 and the like. The micro-mixer fuel nozzle 66 may include a number of micro-mixer tubes 68 positioned about a fuel tube 70. The micro-mixer tubes 68 generally may have substantially uniform diameters and may be arranged in annular, concentric rows. Any number of the micro-mixer tubes 68 may be used herein in any size, shape, or configuration. The micro-mixer tubes 68 may be in communication with the flow of fuel 30 from the fuel tube 70 via a fuel plate 72 and the flow of air 20 from the compressor 15 via the flow path 64. A small volume of the flow of fuel 30 and a small volume of the flow of air 20 may mix within each micro-mixer tube 68. The mixed fuel-air streams may flow downstream for combustion in the combustion zone 60 and used in the turbine 40 as described above. Other components and other configurations may be used herein.

Figure 4:
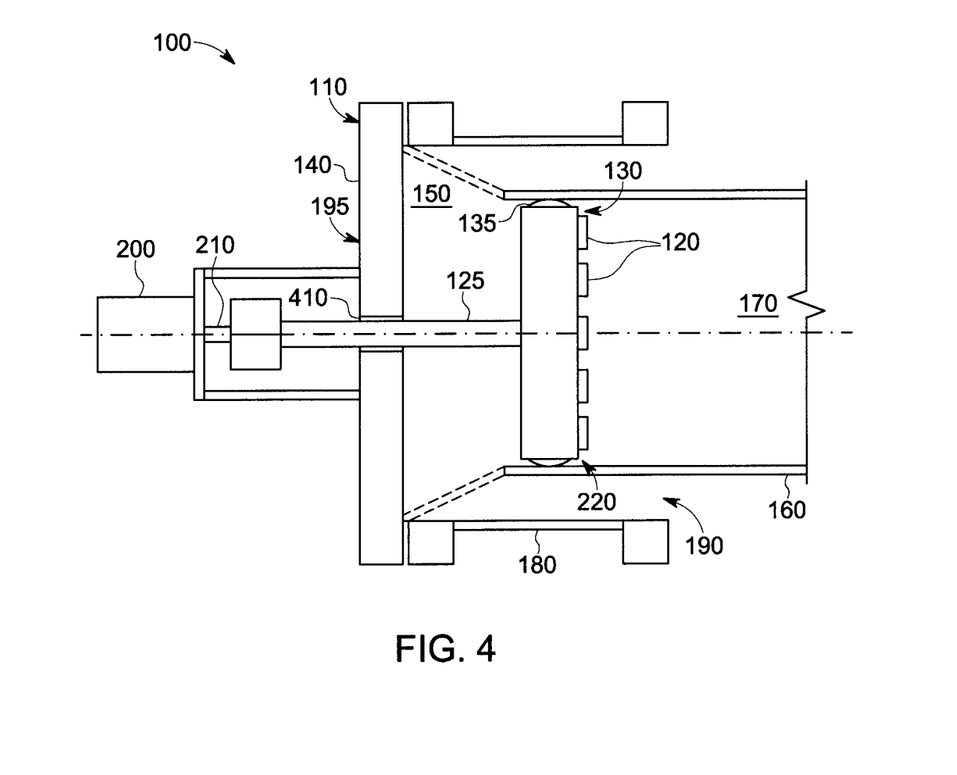
FIG. 4 is a schematic diagram of a micro-mixer combustor as may be described herein.

FIG. 4 shows an example of a combustor 100 as may be described herein. The combustor 100 may be a micro-mixer combustor 110 with any number of the micro-mixer fuel nozzles 120 and the like positioned therein. The micro-mixer fuel nozzles 120 may be similar to those described above. The micro-mixer fuel nozzles 120 may be sector shaped, circular shaped, and/or have any size, shape, or configuration. Likewise, the micro-mixer nozzles 120 may include any number of micro-mixer tubes therein in any configuration. The micro-mixer fuel nozzles 120 may be in communication with a common fuel tube 125. The common fuel tube 125 may carry one or more fuel circuits therein. The multiple fuel circuits thus may allow staging of the micro-mixer fuel nozzles 120. The micro-mixer fuel nozzles 120 may be mounted within a cap assembly 130 or a similar structure. The cap assembly 130 may have any size, shape, or configuration. The cap assembly 130 may be surrounded by a conventional seal 135 and the like.

Similar to that described above, the combustor 100 may extend from an end cover 140 at a head end 150 thereof. A liner 160 may surround the cap assembly 130 and the seal 135 with the micro-mixer fuel nozzles 120 therein. The liner 160 may define a combustion zone 170 downstream of the cap assembly 130. The liner 160 may be surrounded by a case 180. The liner 160, the case 180, and a flow sleeve (not shown) may define a flow path 190 therebetween for the flow of air 20 from the compressor 15 or otherwise. The liner 160, the combustion zone 170, the case 180, and the flow path 190 may have any size, shape, or configuration. Any number of the combustors 100 may be used herein in a can-annular array and the like. Other components and other configurations also may be used herein.

The combustor 100 also may be a variable volume combustor 195. As such, the variable volume combustor 195 may include a linear actuator 200. The linear actuator 200 may be positioned about the end cover 140 and outside thereof. The linear actuator 200 may be of conventional design and may provide linear or axial motion. The linear actuator 200 may be operated mechanically, electro-mechanically, piezeo-electrically, pneumatically, hydraulically, and/or combinations thereof. By way of example, the linear actuator 200 may include a hydraulic cylinder, a rack and pinion system, a ball screw, a hand crank, or any type of device capable of providing controlled axial motion. The linear actuator 200 may be in communication with the overall gas turbine controls for dynamic operation based upon system feedback and the like.

The linear actuator 200 may be in communication with the common fuel tube 125 via a drive rod 210 and the like. The drive rod 210 may have any size, shape, or configuration. The common fuel tube 125 may be positioned about the drive rod 210 for movement therewith. The linear actuator 200, the drive rod 210, and the common fuel tube 125 thus may axially maneuver the cap assembly 130 with the micro-mixer nozzles 120 therein along the length of the liner 160 in any suitable position. The multiple fuel circuits within the common fuel tube 125 may allow for fuel nozzle staging. Other components and other configurations also may be used herein.

In use, the linear actuator 200 may maneuver the cap assembly 130 so as to vary the volume of the head end 150 with respect to the volume of the liner 160. The liner volume (as well as the volume of the combustion zone 170) thus may be reduced or increased by extending or retracting the micro-mixer fuel nozzles 120 along the liner 160. Moreover, the cap assembly 130 may be maneuvered without changing the overall system pressure drop. Typical combustor systems may change the overall pressure drop. Such a pressure drop, however, generally has an impact on cooling the components therein. Moreover, variations in the pressure drop may create difficulties in controlling combustion dynamics.

Changing the upstream and downstream volumes may result in varying the overall reaction residence times and, hence, varying the overall emission levels of nitrogen oxides, carbon monoxide, and other types of emissions. Generally described, reaction residence time directly correlates to liner volume and thus may be adjusted herein to meet the emission requirements for a given mode of operation. Moreover, varying the residence times also may have an impact on turndown and combustor dynamics in that overall acoustic behavior may vary as the head end and the liner volumes vary.

For example, a short residence time generally may be required to ensure low nitrogen oxides levels at base load. Conversely, a longer residence time may be required to reduce carbon monoxide levels at low load conditions. The combustor 100 described herein thus provides optimized emissions and dynamics mitigation as a tunable combustor with no variation in the overall system pressure drop. Specifically, the combustor 100 provides the ability to vary actively the volumes herein so as to tune the combustor 100 to provide a minimal dynamic response without impacting on fuel staging.

Although the linear actuator 200 described herein is shown as maneuvering the micro-mixer fuel nozzles 120 in the cap assembly 130 as a group, multiple linear actuators 200 also may be used so as to maneuver individually the micro-mixer fuel nozzles 120 and to provide nozzle staging. In this example, the individual micro-mixer fuel nozzles 120 may provide additional sealing therebetween and with respect to the cap assembly 130. Rotational movement also may be used herein. Moreover, non-micro-mixer fuel nozzles also may be used herein and/or non-micro-mixer fuel nozzles and micro-mixer fuel nozzles may be used together herein. Other types of axial movement devices also may be used herein. Other component and other configurations may be used herein.

Figure 5:
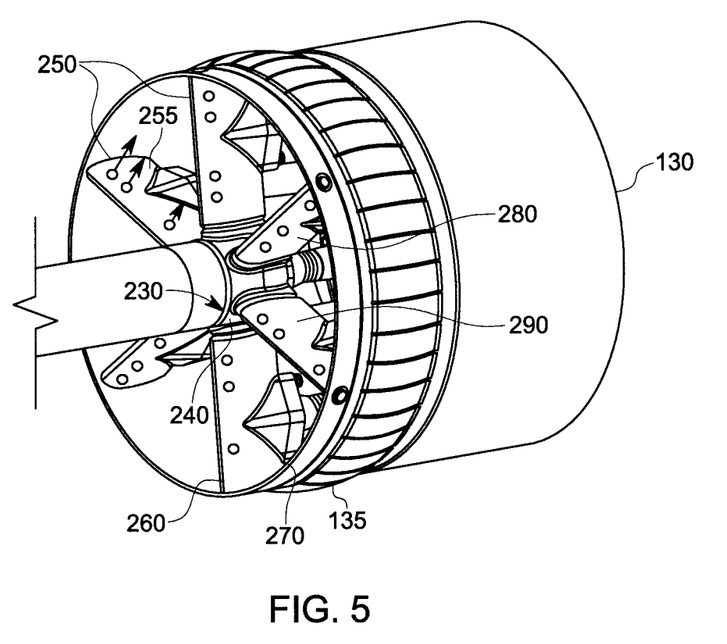
FIG. 5 is a perspective view of an example of the micro-mixer combustor of FIG. 4.
Figure 6:
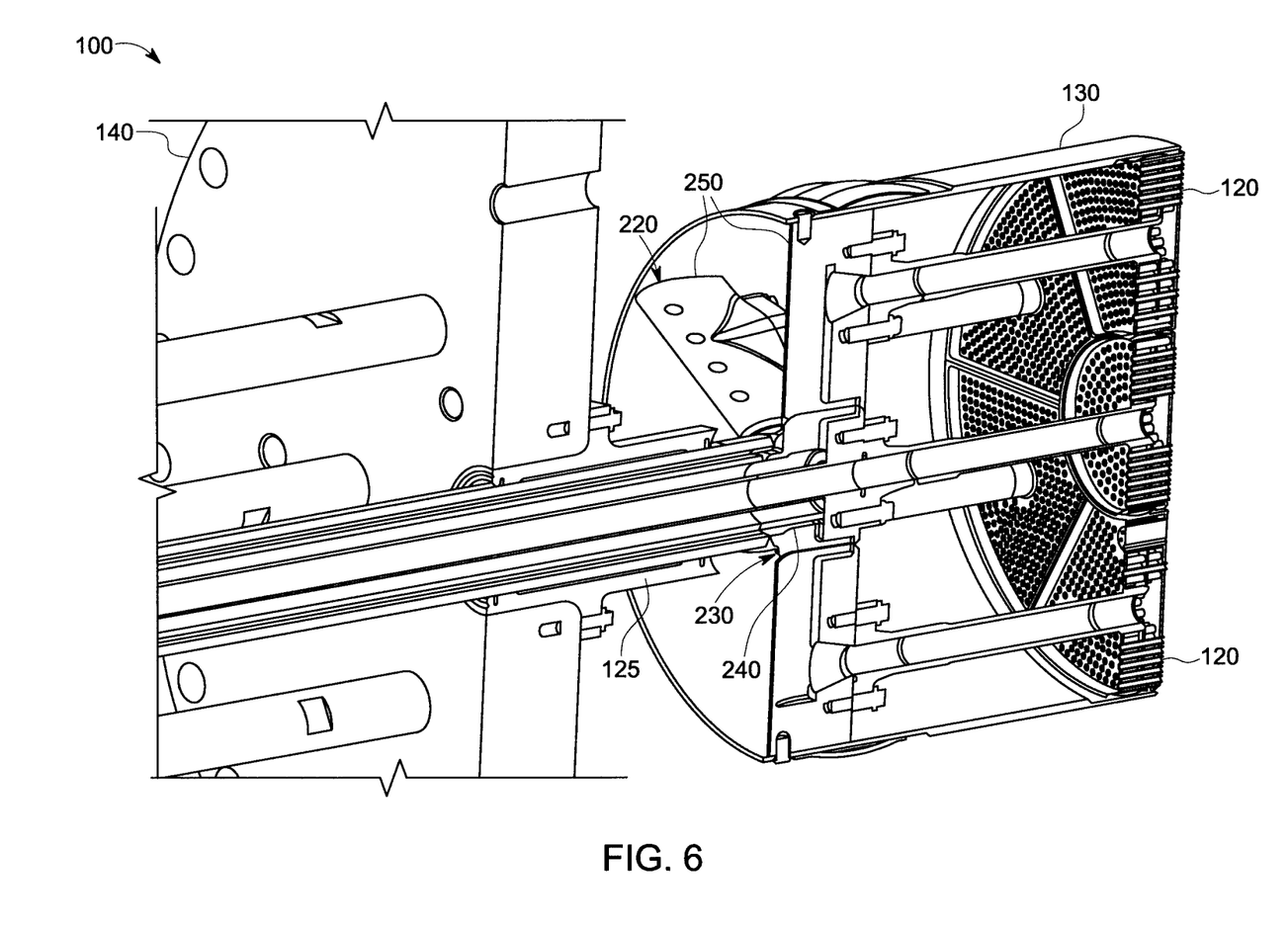
FIG. 6 is a side cross-sectional view of the micro-mixer combustor of FIG. 5.

FIG. 5 and FIG. 6 show an example of a pre-nozzle fuel injection system 220 that may be used with the combustor 100 and the like. Each of the fuel nozzles 120 may be mounted onto the pre-nozzle fuel injection system 220. The pre-nozzle fuel injection system 220 may include a fuel nozzle manifold 230. The fuel nozzle manifold 230 may be in communication with the common fuel tube 125 and may be maneuverable via the drive rod 210 as described above. The fuel nozzle manifold 230 may have any size, shape, or configuration.

The fuel nozzle manifold 230 of the pre-nozzle fuel injection system 220 may include a center hub 240. The center hub 240 may have any size, shape, or configuration. The center hub 240 may accommodate a number of different flows therein. The fuel nozzle manifold 230 of the pre-nozzle fuel injection system 220 may include number of support struts 250 extending from the center hub 240. Any number of the support struts 250 may be used. The support struts 250 may have a substantially aerodynamically contoured shape 255 although any size, shape, or configuration may be used herein. Specifically, each of the support struts 250 may include an upstream end 260, a downstream end 270, a first sidewall 280, and a second sidewall 290. The support struts 250 may extend radially from the center hub 240 to the cap assembly 130. Each support strut 250 may be in communication with one or more of the fuel nozzles 120 so as to provide the flow of fuel 30 thereto. The fuel nozzles 120 may extend axially from the downstream end 270 of each of the support struts 250. Other components and other configurations may be used herein.

In use, the support struts 250 of the pre-nozzle fuel injection system 220 structurally support the fuel nozzles 120 while delivering the flow of fuel 30 thereto. The support struts 250 provide uniform flow of air 20 to the mixing tubes 68 of the fuel nozzles 120. The support struts 250 also may provide a pre-nozzle flow. The pre-nozzle flow mixes with the head end flow of air 20 so as to provide a lean, well mixed fuel/air mixture. The pre-nozzle fuel injection system 220 thus promotes good fuel/air mixing so as to improve overall emissions performance. Moreover, the pre-nozzle flow also provides an additional circuit for fuel staging. This circuit may be adjusted to reduce the amplitude and/or frequency of combustion dynamics. The pre-nozzle fuel injection system 220 thus improves overall combustion performance without adding significant hardware costs.

Figure 7:
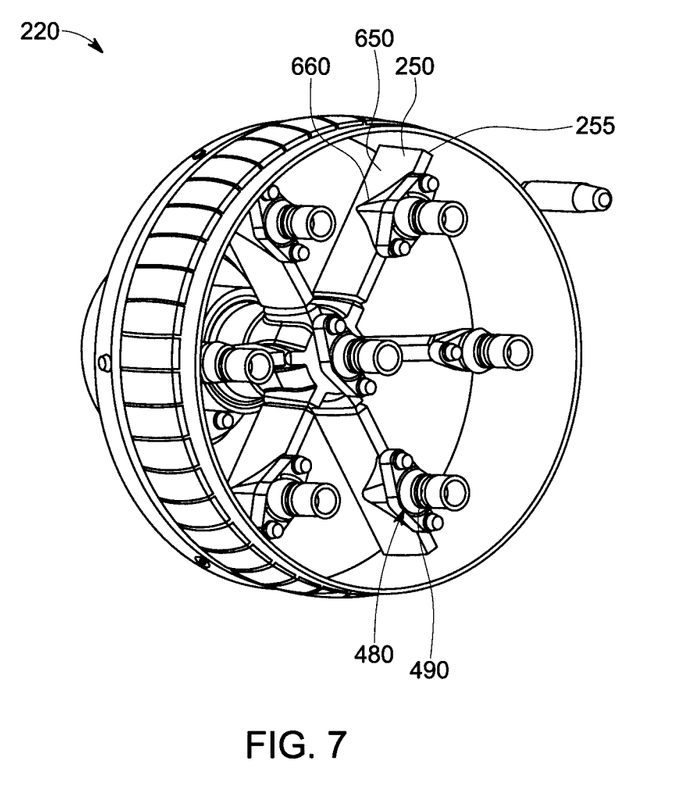
FIG. 7 is a perspective view of a portion of a fuel injection system of the micro-mixer combustor of FIG. 5 with a number of aerodynamic support struts.
Figure 8:
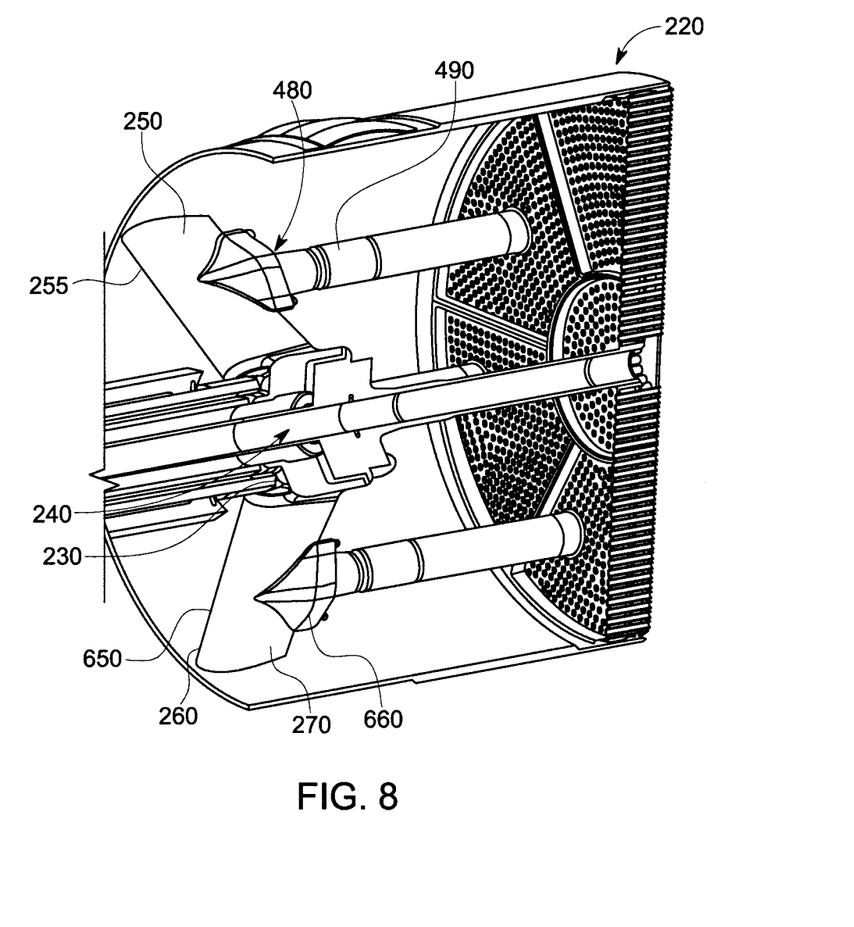
FIG. 8 is a further side cross-sectional view of the fuel injection system of the micro-mixer combustor of FIG. 5 with the aerodynamic support struts.
Figure 9:
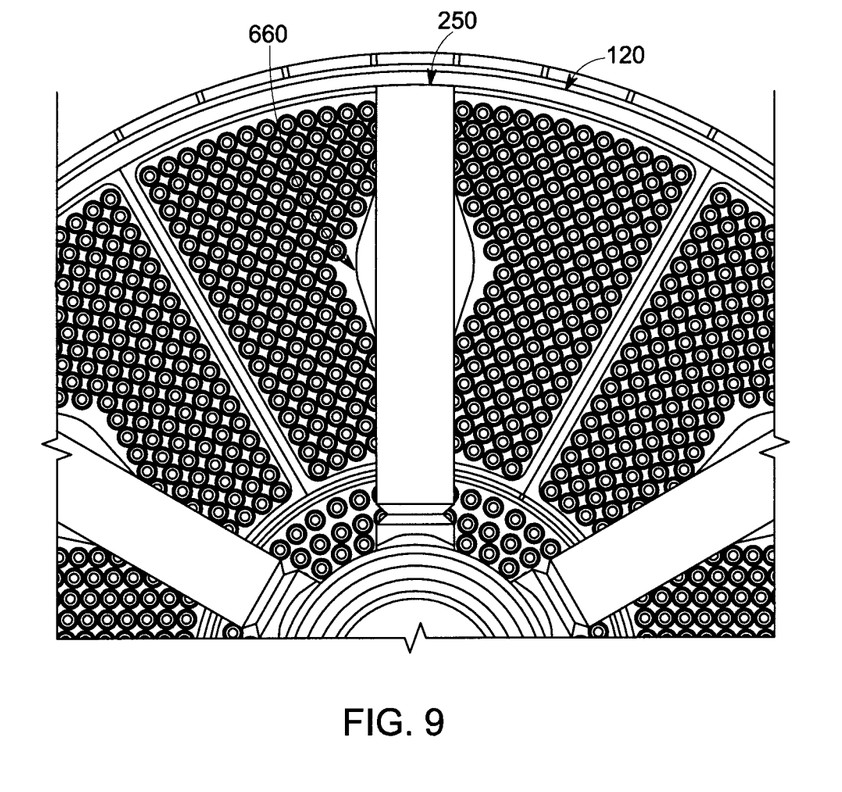
FIG. 9 is an upstream plan view of one of the aerodynamic support struts.

As is shown in FIGS. 7-9, each of the support struts 250 may be in communication with one of the fuel nozzles 120 via an aerodynamic fuel flange 480. The aerodynamic fuel flange 480 also may have an aerodynamic, contoured shape 490. The contoured shape 490 may decrease in diameter downstream of the support struts 250. The contoured shape 490 of the aerodynamic fuel flange 480 may compliment the contoured shape 255 of the support struts 250. The aerodynamic fuel flange 480 may have other sizes, shapes, and configurations.

As described above, the support struts 250 may have the aerodynamic contoured shape 255. As is shown, this aerodynamic contoured shaped 255 may include an airfoil like body 650. The airfoil body 650 may extend from the center hub 240 to the cap assembly 130. The aerodynamic contoured shape 255 of the support struts 250 also may include an aerodynamic mounting section 660. The aerodynamic mounting section 660 may accommodate the aerodynamic fuel flanges 500 and the fuel nozzles 120. The aerodynamic mounting section 660 may include a first built up area 670 on the first sidewall 280 and a second built up area 680 on the second side wall 290. The built up areas 670, 680 may have a substantially half cone-like shape 690 with substantially smooth curves. The built up areas 670, 680 increase in depth from the upstream end 260 to the downstream end 270. The aerodynamic mounting section 660 may have other sizes, shapes, and configurations.

The aerodynamic mounting section 660 about the downstream end 270 of the airfoil body 650 may have one or more fuel ports 700 extending therethrough. Likewise, the downstream end 270 also may have a number of bolt holes 710. The bolt holes 710 permit mounting of the aerodynamic fuel flanges 500 and the fuel nozzles 120 thereon. The aerodynamic mounting section 660 of the support struts 250 thus provides a smooth, aerodynamic transition from the support struts 250 to the aerodynamic fuel flanges 480 to the fuel nozzles 120.

Figure 10:
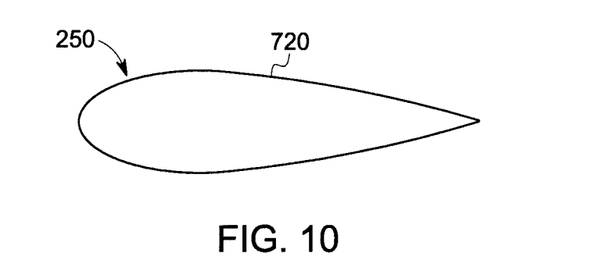
FIG. 10 is a side plan view of an aerodynamic support strut before truncation.
Figure 11:
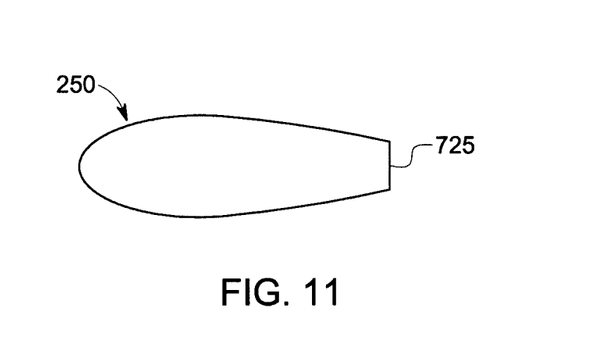
FIG. 11 is a side plan view of an aerodynamic support strut after truncation.
Figure 12:
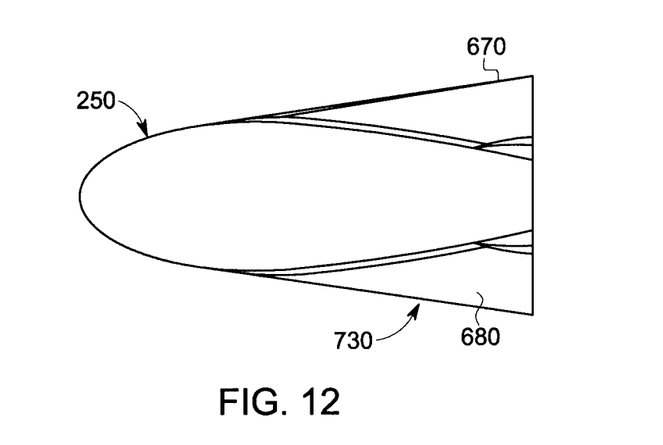
FIG. 12 is a side plan view of an aerodynamic support strut after material buildup.
Figure 13:
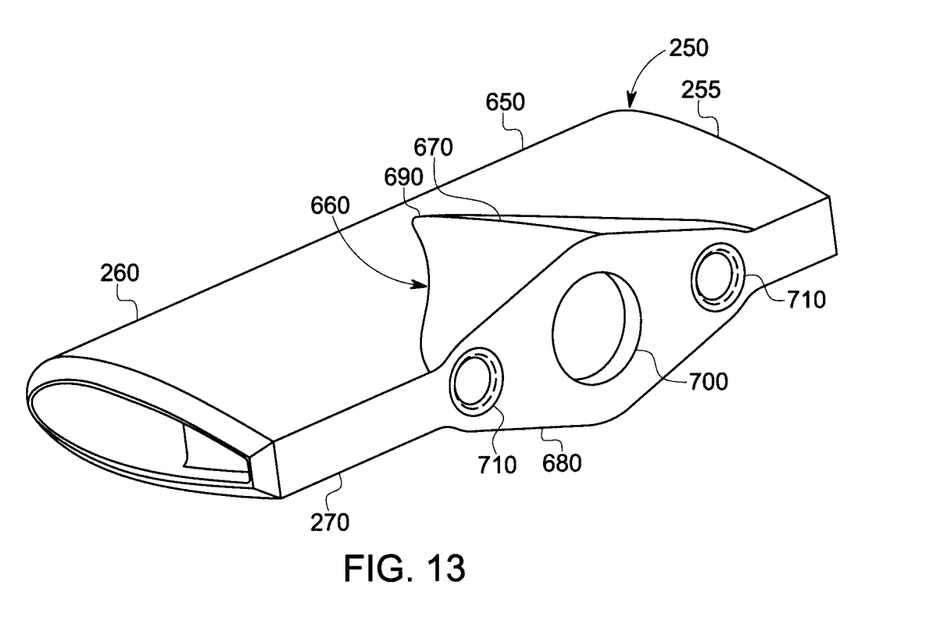
FIG. 13 is a perspective view of an aerodynamic support strut.

FIGS. 10-13 show an example of the creation of the support strut 250 with the aerodynamic mounting section 660 thereon. As is shown in FIG. 10, the support strut 250 may start with a uniform airfoil shape 720. As is shown in FIG. 11, the downstream end 270 then may be truncated so as to result in a truncated end 725. Specifically, the downstream end 270 may be truncated at a value that results in enough land area to bolt the aerodynamic fuel flanges 480 thereon while minimizing the airflow wake. As is shown in FIG. 12, an amount of additional material 730 may be added to create the built up areas 670, 680 of the aerodynamic mounting sections 660. The built up areas 670, 680 provide the substantial half cone-like shape 690. An example of a completed support strut 250 with the aerodynamic mounting section 660 and the fuel port 700 and the bolt holes 710 is shown in FIG. 13. Other components and other configurations also may be used herein.

Figure 14:
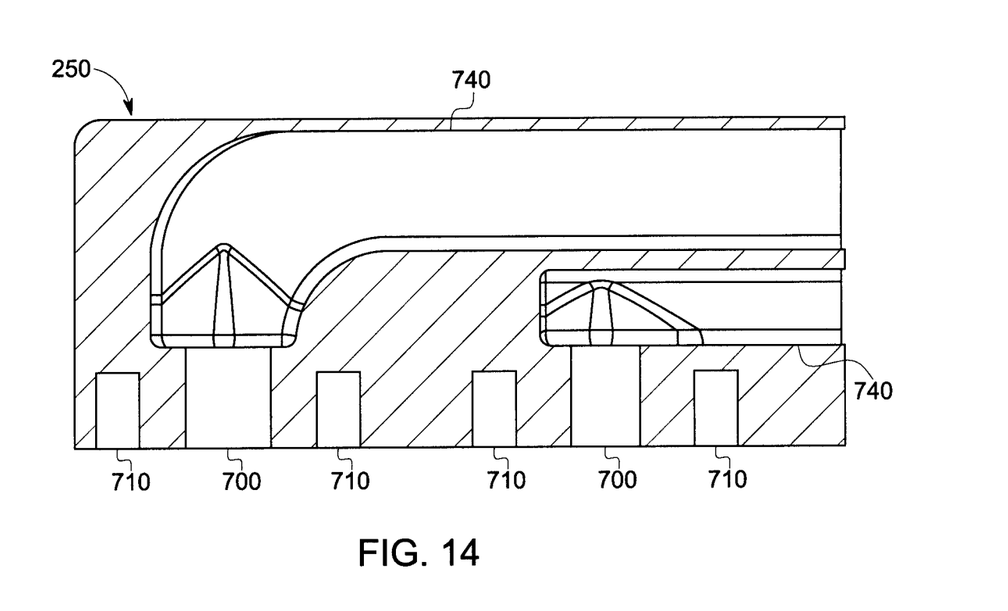
FIG. 14 is a side cross-sectional view of an aerodynamic support strut.

As is shown in FIG. 14, the support struts 250 may have a number of fuel cores 740 extending therethrough. Each fuel core 740 may be in communication with a fuel port 700. The multiple fuel cores 740 may be used with, for example, the main flow, the pre-nozzle flow, and the like. The flow of fuel 30 thus flows from the center hub 240, through the fuel cores 740 of the support struts 250, and through the fuel nozzles 120. Multiple bolt holes 710 also may be used. Other components and other configurations may be used herein.

Any structure in the flow path upstream of the fuel nozzles 120 may cause a mal-distribution in the flow of air 20 to the fuel nozzles 120. This is particularly true with the use of the micro-mixer fuel nozzles 120 because each mixing tube 68 requires the same amount of fuel and air for optimum performance. Any mal-distribution of the flow of air 20 may cause the mixture in some of the tubes 68 to be leaner while the mixture in other tubes 68 may be richer. The use of the aerodynamic fuel flanges 480 and support struts 250 thus helps to minimize the effect of such upstream structures by contouring their profile so as to reduce the cross-sectional area of the support struts and the flanges in the direction of the flow. The contoured shape 490 of the flange 480 compliments the contoured shape 255 of the support struts 250. The contoured shapes also help to straighten the flow as it passes therethrough so as to minimize the creation of recirculation zones.

The aerodynamic fuel flanges 480 and support struts 250 thus may minimize overall emissions by minimizing the variations in the air distribution to the nozzle 120. The aerodynamic fuel flanges 480 and support struts 250 also provide a robust design by minimizing the chance of nozzle flame holding due to a fuel leak. Likewise, the support struts 250 provide the necessary support structure for mounting and fuel delivery to the fuel nozzles 120. The support struts 250 use the contoured aerodynamic shape 255 along with the aerodynamic mounting sections 660 to ensure that the flow of air 20 stays attached to the outer surface so as to provide a uniform air inlet profile to the fuel nozzles 120. The support struts 250 may be machined instead of cast or made by direct metal laser sintering. Other types of construction techniques may be used herein. The fuel nozzles 120 may be removed from the support struts 250 in a similar manner.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A combustor for use with a gas turbine engine, comprising:
a plurality of micro-mixer fuel nozzles; and
a fuel injection system for providing a flow of fuel to the plurality of micro-mixer fuel nozzles; and
the fuel injection system comprising a plurality of support struts supporting the plurality of fuel nozzles and providing the flow of fuel through the plurality of support struts to the plurality of micro-mixer fuel nozzles;
the plurality of support struts comprising an aerodynamic contoured shape and an aerodynamic mounting section;
wherein the plurality of support struts and the aerodynamic mounting section are configured so as to distribute evenly a flow of air to the plurality of micro-mixer fuel nozzles.

2. The combustor of claim 1, wherein the plurality of micro-mixer fuel nozzles comprises a plurality of micro-mixer fuel tubes and a fuel plate.

3. The combustor of claim 1, wherein the plurality of support struts comprises an airfoil body.

4. The combustor of claim 1, wherein the aerodynamic mounting section comprises a first built up area on a first sidewall and a second built up area on a second sidewall.

5. The combustor of claim 4, wherein the first built up area and the second built up area comprise a substantially half cone-like shape.

6. The combustor of claim 4, wherein the first built up area and the second built up area comprise an increasing depth from an upstream end to a downstream end.

7. The combustor of claim 1, wherein the aerodynamic mounting section comprises one or more fuel ports therein.

8. The combustor of claim 7, wherein the plurality of support struts comprises one or more fuel cores in communication with the one or more fuel ports.

9. The combustor of claim 1, wherein the aerodynamic mounting area comprises one or more bolt holes therein.

10. The combustor of claim 1, wherein the aerodynamic mounting area comprises a truncated end.

11. The combustor of claim 1, further comprising a plurality of aerodynamic fuel flanges connecting the plurality of micro-mixer fuel nozzles and the plurality of support struts.

12. The combustor of claim 11, wherein the plurality of aerodynamic fuel flanges comprises a contoured shape.

13. The combustor of claim 1, further comprising a linear actuator to maneuver the plurality of micro-mixer fuel nozzles.

14. A support strut for use with a micro-mixer fuel nozzle, comprising:
an airfoil body; and
an aerodynamic mounting section positioned on the airfoil body;
wherein the aerodynamic mounting section comprises a first built up area on a first sidewall and a second built up area on a second sidewall; and
wherein the aerodynamic mounting section comprises one or more fuel ports therein providing a flow of fuel from the airfoil body through the aerodynamic mounting section to the micro-mixer fuel nozzle.

15. The support strut of claim 14, wherein the first built up area and the second built up area comprise a substantially half cone-like shape.

16. The support strut of claim 14, wherein the first built up area and the second built up area comprise an increasing depth from an upstream end to a downstream end.

17. The support strut of claim 14, wherein the airfoil body comprises one or more fuel cores in communication with one or more fuel ports.

18. The support strut of claim 14, wherein the airfoil body comprises one or more bolt holes therein.

19. A fuel manifold for providing a flow of fuel in a gas turbine engine, comprising:
a plurality of micro-mixer fuel nozzles; and a plurality of support struts supporting the plurality of fuel nozzles and providing the flow of fuel through the plurality of support struts to the plurality of micro-mixer fuel nozzles;

the plurality of support struts comprising an aerodynamic contoured shape with an aerodynamic mounting section thereon.

\* \* \* \* \*